Feb. 11, 1941.  P. S. DICKEY  2,231,569
MOTOR CONTROL SYSTEM
Filed July 2, 1938  2 Sheets-Sheet 1

Inventor
PAUL S. DICKEY
By Raymond D. Junkins
Attorney

Feb. 11, 1941. P. S. DICKEY 2,231,569
MOTOR CONTROL SYSTEM
Filed July 2, 1938 2 Sheets-Sheet 2

Inventor
PAUL S. DICKEY
By Raymond W. Jenkins
Attorney

Patented Feb. 11, 1941

2,231,569

UNITED STATES PATENT OFFICE 2,231,569

MOTOR CONTROL SYSTEM

Paul S. Dickey, Cleveland, Ohio, assignor to Bailey Meter Company, a corporation of Delaware Application July 2, 1938, Serial No. 217,318

8 Claims. (Cl. 172—239)

This invention relates to motor control systems for use in regulating or controlling any electric, chemical, thermal, physical, or other variable quantity or condition or relation, and which may be through the control of a corrective agent or agents. While I have illustrated and described my invention as relating to control systems wherein electrical energy is utilized as the motive power for actuating devices to control the rate of application of an agent or the value of a variable, it is to be understood that this is illustrative only.

An object of the invention is to provide an apparatus capable of transmitting and receiving impulses representative of the value of the variable quantity or condition.

A further object is to provide a telemetric system wherein a plurality of transmitters are effective upon a single receiver which is differentially responsive to the duration and sense of the signals cyclically transmitted by the plurality of transmitters.

With these and other objects in view I will now describe the drawings in which is represented a preferred embodiment of my invention.

Figure 1:
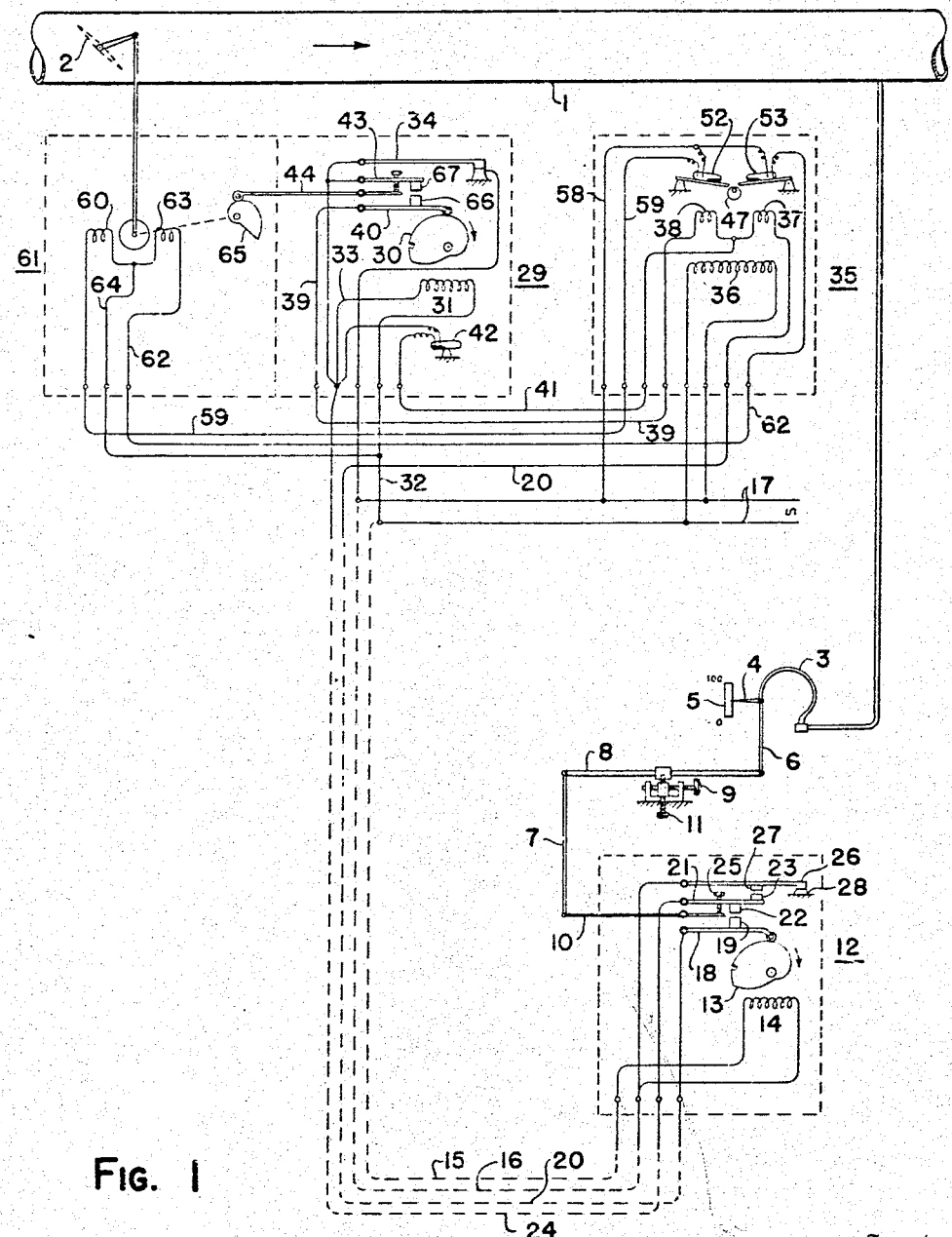
Fig. 1 is a somewhat diagrammatic arrangement of a preferred embodiment of my invention.

Referring now to Fig. 1, I indicate at 1 a conduit through which a fluid is flowing in the direction of the arrow. A damper 2 may be positioned in the conduit to regulate the pressure of the fluid, which pressure is effective in positioning a Bourdon tube 3 having an indicator arm 4 moved relative to an index 5. The Bourdon tube 3 is pivotally connected to angularly position a member 10 through links 6, 7 and beam 8. The beam 8 is provided with a movable fulcrum whereby through the agency of a threaded screw 9 the moment arm of the beam 8 adjacent the link 6 may be varied relative to the moment arm adjacent the link 7, and thus the angular movement transmitted to the member 10 for each increment of movement of the pointer 4 relative to the index 5 may be varied as desired by movement of the screw 9. An adjusting screw 11 is also provided whereby the actual angular position of the member 10 may be varied for any given position of the indicator arm 4. To accomplish this the screw 11 raises or lowers the fulcrum, thus positioning the beam 8 in a clockwise or counterclockwise direction around the lower pivot end of the link 6.

I indicate at 12 a transmitter having a continuously rotated time cam 13 rotated by a synchronous alternating current motor 14 connected by the conductors 15, 16 with a power source 17. Riding on the periphery of the time cam 13 is a roller carried at the free end of a pivoted arm 18, which arm carries a contact 19 connected to a conductor 20.

A second pivoted arm 21 has contact portions 22, 23 and is connected to a conductor 24. A screw 25 is threaded through the arm 21 and provides a stop whereby the arm 21, normally by gravity, rests at a lower position determined by the angular position of the member 10 around its pivot. In other words, as the member 10 is moved in clockwise or counterclockwise direction, being positioned through the movement of the Bourdon tube 3, it (through engagement with the screw 25) positions the arm 21 around its pivot.

A third pivoted arm 26 carries a contact 27 adapted to cooperate with the contact 23 and connected to the conductor 16. The normal position (of gravity rest) of the arm 26 is with its free end against a stop 28.

The time cam 13 periodically positions the arm 18 around its pivot until the contacts 19, 22 engage, thus making connection between the conductors 20, 24. Additional rotation of the cam 13 carries the arm 21 upwardly until the contacts 23, 27 engage, thus closing circuit between the conductors 16, 24. It will be observed that in each cycle of the cam 13 the duration of the contact closure 19, 22 and correspondingly of the signal originated thereby is determined by the initial position of the arm 21, which in turn is determined by the position of the member 10, related to the position of the Bourdon tube 3, and thereby directly related to the value of the variable quantity, in this case the pressure of the fluid within the conduit 1. Thus the duration of the principal signal initiated by the transmitter 12 is directly representative of or proportional to a variable quantity.

A second transmitter 29 is quite similar in construction. A time cam 30 is continuously rotated by a motor 31, the latter connected through the conductor 32 with the source of power 17 and through the conductor 33 to the conductor 24.

A pivoted contact arm 34 is shown in normally close-circuited position, connecting one side of the power source 17 with the conductors 24 and 33.

That portion of the arrangement including the contact arm 34, the contacts controlled thereby, the contact arm 26, contacts 23, 27 provide two pair of contacts arranged in parallel to connect the conductor 33 of the motor 31 to the return side of the power source 17. It will be observed that in the transmitter 12 the contacts controlled by the arm 26 are normally open circuited while in the transmitter 29 the contacts controlled by the arm 34 are normally close-circuited. Also that these two pair of contacts comprise a phasing system for the time cams 13, 30 whereby the synchronous motors 14, 31 are kept in proper phase relation, and thus the principal periodic or cyclic signaling is correctly interrelated. The motors 14, 31 being synchronous motors and connected across the same source of alternating current will rotate at the same speed. However, there is a possibility that the two time cams 13, 30 might be out of proper phase relationship through the initial starting or some accidental stopping of one of the cams relative to the other.

So long as the cams are in proper phase relation then the motor winding 31, under control of the contact arms 26, 34 will not be deenergized and the cams 30, 13 will rotate in phase relation with each other. If, however, for some reason the angular position of the cam 30 relative to the cam 13 is different therefrom, then there may occur in a given cycle an open circuiting of the winding 31 by the contact arm 34 while the contacts 23, 27 are open, and thus rotation of the cam 30 would be halted until the cam 13 rotated about and was again in phase relation with the cam 30, whereupon the motor 31 would restart and the two cams proceed in proper phase relation.

At 35 I indicate in general a receiver which takes the general form of a relay device having an alternating current synchronous torque motor differentially responsive to the duration and sense of signals cyclically originated at the transmitters 12, 29. A field winding 36 is continuously energized directly across the power source 17. Shading coils 37, 38 are provided with the arrangement such that if both shading coils are simultaneously energized or simultaneously deenergized, then the rotor 46 is not urged to rotation. If, however, there is an overlap in one direction or the other of energization of the shading coil 38 relative to the shading coil 37, then rotation of the rotor will occur in a predetermined direction and for a time extent determined by the time length of the overlap. Thus the angular movement of the rotor is in accordance with the algebraic summation of signals periodically initiated at the transmitters 12, 29 and effective in energizing the shading coils 37, 38. This is accomplished as follows:

The shading coil 37 is connected through the conductor 20 to the contact arm 18 of the transmitter 12. The shading coil 38 is connected through a conductor 39 with a similar pivoted arm 40 in the transmitter 29. The neutral of the shading coils 37, 38 is connected through a conductor 41 with the conductor 24 through a mercury switch 42. The latter is adapted to be positioned by the motor 31 to open its circuit at a predetermined point and over a predetermined portion of rotation of the cam 30.

In the transmitter 29 is also located a pivoted contact arm 43, generally similar to the contact arm 21 of transmitter 12, and which is adapted under certain conditions to cause a closing of circuit between the conductors 24, 39. Such closure of circuit is for a duration of each revolution of the cam 30 determined by the position of the pivoted arm 44 in a manner similar to that described for transmitter 12 and the member 10.

It will now be observed that a circuit closure of the contacts 19, 22 at the transmitter 12 will short out the shading coil 37 (assuming the mercury switch 42 is close-circuited); while closure of the contacts 66, 67 will short out the shading coil 38. If the positions of the contact arms 21, 43 relative to the arms 18, 40 are the same, then the shading coils 37, 38 will be shorted out for identical portions of each time cycle and induced current will flow through the two shading coils for the same period of time. Likewise, throughout the remainder of the time cycle the shading coils 37, 38 will be open circuited. Thus there will be no urge by either of the shading coils 37 or 38 to cause rotation of the rotor. If, however, circuit closure at 19, 22 is of longer duration than at 66, 67, then there will be an overlap of close circuiting of the shading coil 37 beyond the portion of the time cycle when the coil 38 is close circuited, and for such period of overlap the motor in the receiving device 35 will be urged to angular movement in predetermined direction.

When the position of the member 10 is different than that of the arm 44, the contacts 19, 22 will close either earlier or later than the contacts 66, 67, but the period of energization of the shading coils 37, 38 will be terminated simultaneously through open circuiting of the mercury switch 42 at a predetermined point of the periphery of the cam 30.

Figure 3:
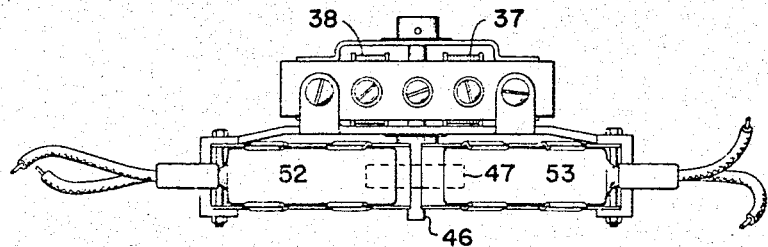
Fig. 3 is a plan view of the relay of Fig. 2.
Figure 2:
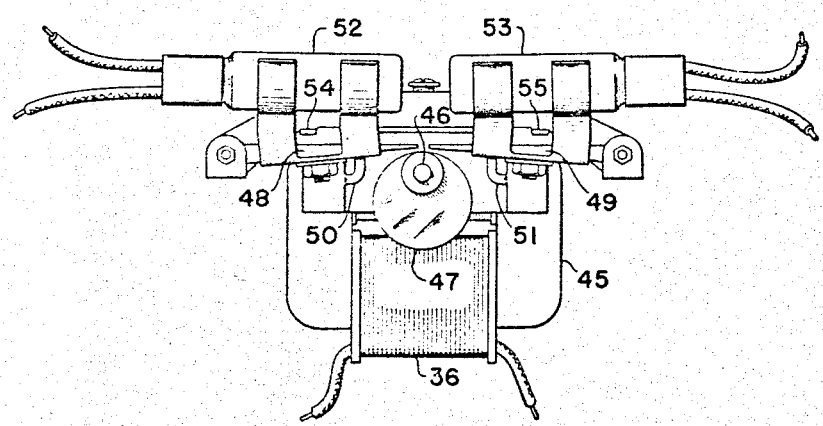
Fig. 2 is a side elevation of a relay.

Referring now to Figs. 2 and 3, I illustrate therein more nearly the preferred structural form and arrangement of the relay 35. An alternating current synchronous motor having a continuously energized field winding 36 is provided with suitable laminations 45 and two opposed shading coils 37, 38. The motor has a rotor 46 on which is mounted an eccentric or cam 47 normally positioned by gravity, as illustrated in Fig. 2, with the greatest eccentricity downwardly. Upon an unbalance in energization of the shading coils 37, 38 the rotor 46 will be urged to rotation in one direction or the other and carry with it the eccentric 47.

The eccentric is adapted, in its angular positioning, to engage the underside of the free end of the pivoted leaf members 48, 49 which normally rest by gravity against the fixed stops 50, 51. Carried on and by the leaf members 48, 49 are mercury switches 52, 53.

Assume that the eccentric 47 is urged to angular positioning in a clockwise direction. After having traversed a predetermined angular amount from the position of rest as shown in Fig. 2, in its rise the eccentric will engage the underside of the free end of the leaf member 48, carrying the leaf member in angular counterclockwise movement until the leaf member engages an upper stop 54 to limit its counterclockwise rotation. In like manner clockwise movement of the leaf member 49 is possible until it engages an upper stop 55.

If the leaf member 48 and the mercury switch 52 carried thereby, is positioned upwardly until the stop 54 is engaged, and the unequal energization of the shading coils 37, 38 persists, then the eccentric 47 will hold the leaf member 48 against the stop 54 until the shading coils 37, 38 are no longer unbalanced: being either simultaneously energized or simultaneously deenergized. It is apparent that by such action the rotor 46 will remain in a stalled position, but the construction of the motor is such that no damage will occur thereby.

Figure 4:
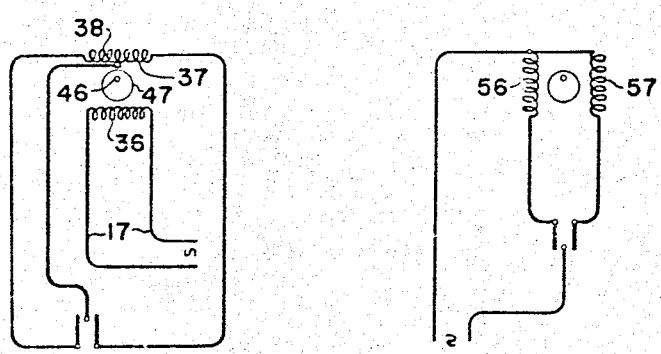
Fig. 4 is a simplified wiring diagram of the relay illustrated in Figs. 2 and 3.
Figure 5:
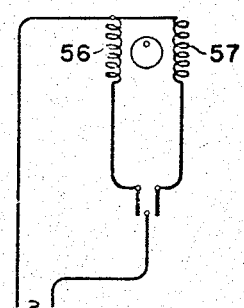
Fig. 5 is a simplified wiring diagram of another form of relay.

The simplified wiring diagram, Fig. 4, indicates the possibility of selectively or simultaneously close-circuiting the shading coils 37, 38. In like manner, a self-starting synchronous motor having opposed field windings is illustrated diagrammatically in Fig. 5, wherein either, or both, or neither of the field windings 56, 57 may be selectively energized. If both of the field windings are energized, or deenergized, then the rotor is not urged to rotation. If one only of the field windings 56, 57 is energized, then the rotor is urged to rotation in predetermined direction.

Referring now to Fig. 1, the mercury switches 52, 53 are shown in normal open circuited condition. If the shading coils 37, 38 are unequally energized, that is with an overlap of energization one relative to the other, then a close circuiting of the mercury switch 52, or of the mercury switch 53 will result in duration and direction dependent upon the relative energization of the shading coils 37, 38.

The neutral of the mercury switches 52, 53 is connected by a conductor 58 with one side of the power source 17. The other terminal of the mercury switch 52 is connected by a conductor 59 with one field winding 60 of a reversing motor generally indicated at 61. The other terminal of the mercury switch 53 is connected through a conductor 62 with another field winding 63 of the motor 61. The neutral from the motor 61 is connected through a conductor 64 with the opposite side of the power source 17 through the conductor 32.

The motor 61 is of a reversing type wherein energization of the winding 60 or of the winding 63 will cause rotation in predetermined direction and for so long as such winding remains energized. The arrangement and functioning of the receiving device 35 is such that both of the windings 60, 63 will not be energized simultaneously.

The motor 61 is adapted through the necessary gear reduction to angularly position the damper 2 across the conduit 1 for regulating or controlling the pressure of the fluid therein effective upon the Bourdon tube 3. At the same time the motor 61 is arranged to position a cam 65 carrying on its periphery the roller arm end of the pivoted member 44. Thus the position of the cam 65, the motor 61, and consequently of the damper 2, is reflected in the position of the member 44 and correspondingly of the contact arm 43. Likewise, the position of the damper 2 is reflected in the length of contact closure between the contacts 66, 67 as determined by that proportion of the periphery of the cam 30 during which they are close-circuited.

In general, it will be observed that I have provided a transmitter 12 wherein signals are cyclically originated through contact closure 19, 22 for a time duration determined by the value of the variable (in this case fluid pressure within the conduit 1 effective within the Bourdon tube 3). Signals originated in the transmitter 12 are telemetrically transmitted to a receiver 35 where they control the energization of the shading coil 37. At the same time the transmitter 29 cyclically originates signals each of a time duration dependent upon the position of the member 44 for that proportion of the periphery of the cam 30 during which the contacts 66, 67 are close circuited. Such periodic signals are telemetrically transmitted to the receiver 35 wherein they control energization of the shading coil 38.

It will thus be seen that the receiving mechanism 35 is differentially responsive to the signal originating in the transmitter 12 and to those originating in the transmitter 29 and that the signals sent out by the mercury switches 52, 53 are in sense and duration the algebraic summation of the signals originating in the transmitters 12, 29. Such signals sent out from the receiving mechanism 35 are periodic and are telemetrically transmitted to a motor or power means 61 wherein they control the direction and extent of a movement reflected in the damper and in the cam 65.

The positioning by the power means 61 of the damper 2 results in a control of the fluid within the conduit 1 and thereby of the variable which is instigating and determining the signal at the transmitter 12. At the same time the positioning of the cam 65 determines the signal initiated at the transmitter 29.

It will further be seen that in effect I have a telemetric system wherein a primary transmitter 12 and a primary transmitter 29 telemetrically transmit cyclic signals to a receiver 35 which is in itself a transmitter differentially responsive to the signals from the transmitters 12 and 29 and itself telemetrically transmitting cyclic signals of a direction and duration being the algebraic sum of said primary signals. These resultant signals pass to a receiving power means 61.

While I have chosen to illustrate and describe a preferred embodiment of my invention, it is to be understood that I am not to be limited thereby but only as to the claims in view of prior art.

What I claim as new, and desire to secure by Letters Patent of the United States, is:

1. A telemetric system, comprising in combination, a first transmitter for cyclically telemetering signals of a time duration corresponding to a first variable quantity, a second transmitter for cyclically telemetering signals of a time duration corresponding to a second variable quantity, receiver means responsive to said signals, a motor having two windings, and means controlled by said receiver means for cyclically energizing one or the other of said windings selectively in dependence upon the relative time duration of the signals cyclically telemetered by said first and second transmitters.

2. A telemetric system, comprising in combination, a first transmitter for cyclically telemetering signals of a time duration corresponding to a first variable quantity, a second transmitter for cyclically telemetering signals of a time duration corresponding to a second variable quantity, receiver means responsive to said signals, a motor having two windings, and means controlled by said receiver means for cyclically energizing one or the other of said windings for an increment of time corresponding to the difference in time duration of said signals and selectively in dependence upon the relative time duration of said signals.

3. A telemetric system, comprising in combination, a first transmitter for cyclically telemetering signals of a time duration corresponding to a first variable quantity, a second transmitter for cyclically telemetering signals of a variable time duration, receiver means responsive to said signals, a motor having a first winding which when energized urges said motor to operation in one direction and a second winding which when energized urges said motor to operation in opposite direction, means controlled by said receiver means for cyclically energizing one or the other of said windings selectively in dependence upon the relative time duration of the signals cyclically telemetered by said first and second transmitters, a cam positioned by said motor, and means operated by said cam for varying the time duration of the signals telemetered by the second transmitter so as to maintain said signals equal in time duration to those telemetered by said first transmitter.

4. A telemetric system comprising in combination, a first transmitter for cyclically telemetering signals of a time duration corresponding to a first variable quantity, a second transmitter for cyclically telemetering signals of a time duration corresponding to a second variable quantity, receiving means differentially responsive to said signals and comprising an opposed wound motor having a freely rotating cam and rotor assembly for actuating pivoted switch members, a motor having two windings, and said receiver means cyclically selectively closing a switch member energizing one or the other of said motor windings in dependence upon the relative time duration of the signals cyclically telemetered by said first and second transmitters.

5. A telemetric system, comprising in combinaation, a first transmitter for cyclically telemetering signals of a time duration corresponding to a first variable quantity, a second transmitter for cyclically telemetering signals of a time duration corresponding to a second variable quantity, receiver means responsive to said signals, a reversible motor, and means controlled by said receiver means for cyclically energizing said motor to cause selective operation thereof in dependence upon the relative time duration of the signals cyclically telemetered by said first and second transmitters.

6. A telemetric system, comprising in combition, a first transmitter for cyclically telemeter signals of a time duration corresponding to a f variable quantity, a second transmitter for cy cally telemetering signals of a time duration c responding to a second variable quantity, recei means responsive to said signals, a revers motor, and means controlled by said recei means for cyclically energizing said motor cause forward or reverse operation thereof an increment of time corresponding to the c ference in time duration of said signals, and lectively in dependence upon the relative ti duration of said signals.

7. A telemetric system, comprising in combi tion, a first transmitter for cyclically telemeter signals of a time duration corresponding to a f variable quantity, a second transmitter for cy cally telemetering signals of a variable time du tion, receiver means responsive to said signal reversible motor, means controlled by said rece ing means for cyclically operating said motor one direction or the other selectively in depe ence upon the relative time duration of the s nals cyclically telemetered by said first and s ond transmitters, and means positioned by s motor for altering the time duration of the s nals transmitted by said second transmitter correspondence with changes in the posit thereof.

8. A telemetric system, comprising in combi tion, a first transmitter for cyclically telemeter first signals, means for adjusting said first tra mitter to vary the time duration of said first s nals, a second transmitter for cyclically te metering second signals, means for adjusting s second transmitter to vary the time duration said second signals, receiver means responsive said signals, a reversible motor, and means c trolled by said receiver means for cyclically en gizing said motor to cause selective operat thereof in dependence upon the relative ti duration of the signals cyclically telemetered said first and second transmitters.

PAUL S. DICKEY